United States Patent [19]
Watanabe

[11] Patent Number: 5,672,954
[45] Date of Patent: Sep. 30, 1997

[54] CONTROL SYSTEM FOR AC GENERATOR

[75] Inventor: Hirofumi Watanabe, Himeji, Japan

[73] Assignee: Mitsubishi Denki Kabushiki Kaisha, Tokyo, Japan

[21] Appl. No.: 544,673

[22] Filed: Oct. 18, 1995

[30] Foreign Application Priority Data

Oct. 26, 1994 [JP] Japan .................................. 6-262592

[51] Int. Cl.$^6$ .................................................. H02J 7/14
[52] U.S. Cl. .................................................. 322/28; 322/22
[58] Field of Search .................................. 322/25, 26, 27, 322/28

[56] References Cited

U.S. PATENT DOCUMENTS

| | | | |
|---|---|---|---|
| 4,084,126 | 4/1978 | Clements | 322/8 |
| 4,839,576 | 6/1989 | Kaneyuki et al. | 322/25 |
| 4,985,670 | 1/1991 | Kaneyuki et al. | 322/28 |
| 5,061,889 | 10/1991 | Iwatani et al. | 322/28 |
| 5,089,766 | 2/1992 | Iwatani | 322/25 |
| 5,157,321 | 10/1992 | Kato et al. | 322/28 |
| 5,497,071 | 3/1996 | Iwatani et al. | 322/28 |
| 5,512,813 | 4/1996 | Uchinami | 322/28 |

FOREIGN PATENT DOCUMENTS

| | | |
|---|---|---|
| 0106539 | 4/1984 | European Pat. Off. . |
| 0407641 | 1/1991 | European Pat. Off. . |
| 0446184 | 9/1991 | European Pat. Off. . |
| 302735 | 12/1988 | Japan . |

*Primary Examiner*—Steven L. Stephan
*Assistant Examiner*—Nicholas Ponomarenko
*Attorney, Agent, or Firm*—Sughrue, Mion, Zinn, Macpeak and Seas

[57] ABSTRACT

A highly reliable control system for AC generator capable of reducing such adverse effects as belt slippage or a drop in engine rpm's of a vehicle due to an abruptly increased torque of the AC generator. The system comprises: a rectifier 2 for rectifying an AC output of the AC generator 1 having a field coil 102; a storage battery 4 to be charged by a rectified output of the rectifier 2; an output changeover controller 7 for switching between the storage battery and a load to be driven by a voltage higher than a normal output voltage at the time of charging the storage battery; and a voltage regulator 3A for intermittently controlling a field current flowing through the field coil 102 to adjust voltage of the storage battery 4 in a first operation mode for charging of the storage battery and to adjust output voltage of the AC generator 1 in a second operation mode which is a high voltage operation, respectively, to predetermined values in the respective operation modes whereby the ON period in the intermittent control of field current is gradually increased when switching from the first operation mode to the second operation mode.

10 Claims, 4 Drawing Sheets

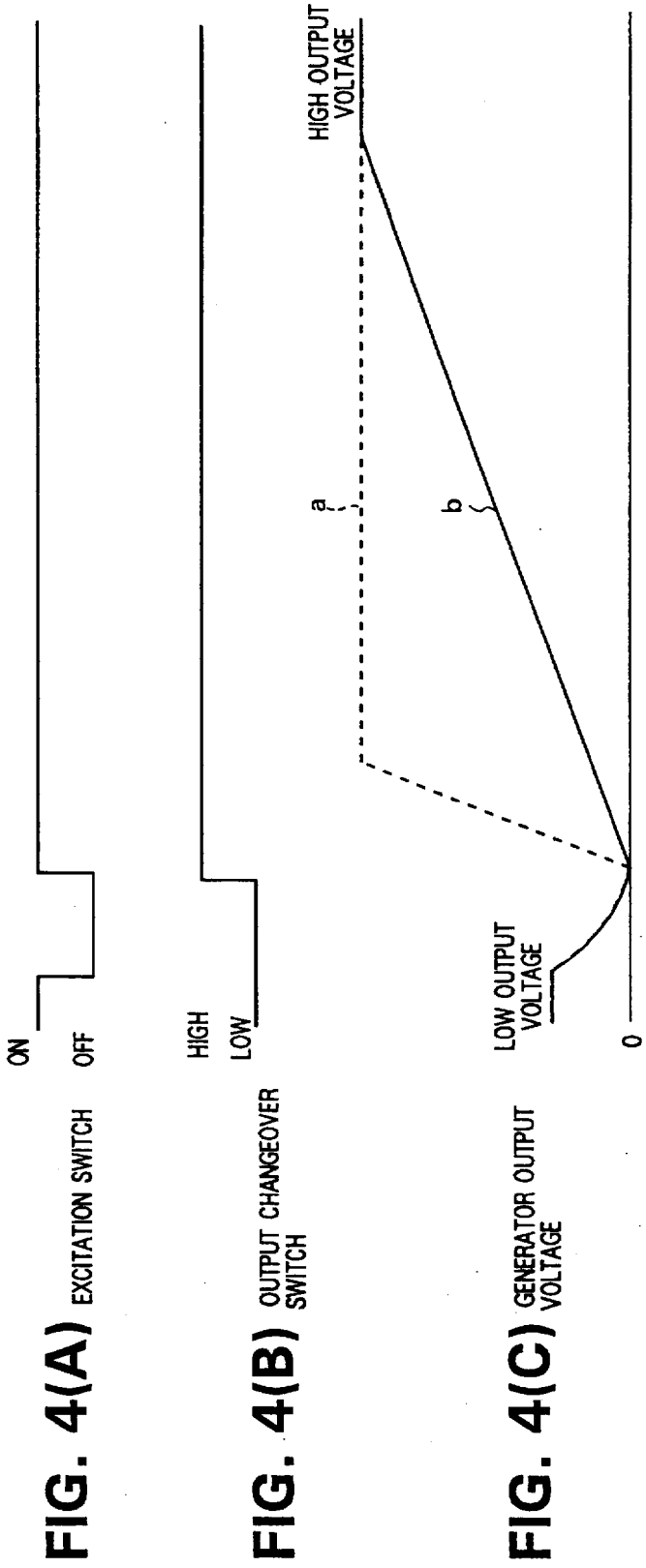
FIG. 4(A) EXCITATION SWITCH
FIG. 4(B) OUTPUT CHANGEOVER SWITCH
FIG. 4(C) GENERATOR OUTPUT VOLTAGE

CONTROL SYSTEM FOR AC GENERATOR

BACKGROUND OF THE INVENTION

1. Field of the Invention

The present invention relates to a control system for an AC generator and, more particularly, relates to a control system for an AC generator suitable for use for example, in a vehicle or the like, and which is capable of switching the output of the generator to a high voltage electrical load to be driven at a voltage higher than normal for a short period of time.

2. Description of the Related Art

FIG. 3 is a circuit diagram showing a conventional control system for AC generator for use in a vehicle or the like. In FIG. 3, an AC generator driven by an engine (not shown) is constituted by an armature coil 101 and a field coil 102. A rectifier 2 is connected to the armature coil 101 of the AC generator 1 to effect full-wave rectification of the AC output of the AC generator 1, and it has a positive side output terminal 201 and a negative side output terminal 202, the negative side output terminal 202 being grounded. A voltage regulator 3 is connected to the field coil 102 of the AC generator 1 and to the rectifier 2 to control the output voltage of the AC generator 1 at a predetermined value.

The voltage regulator 3 includes: voltage dividing resistors 301 and 302 connected between ground and the positive side of a storage battery 4 to be charged by the rectification output of the AC generator 1; voltage dividing resistors 303, 304 and 305 connected between ground and the positive side output terminal 201 which is a rectified current output terminal; a transistor 307 connected between ground and one end of the field coil 102 via a resistor 306; a Zener diode 308 connected at the anode thereof to a base of the transistor 307; diodes 309 and 310 both connected at the cathodes thereof to the cathode of the Zener diode 308 and respectively connected at anodes thereof to a connecting point between the voltage dividing resistors 304 and 305 and to a connecting point between the voltage dividing resistors 301 and 302; an output transistor 312 connected at the collector thereof to one end of the field coil 102 via a diode 311, connected at the base thereof to a connecting point between the resistor 306 and the collector of the transistor 307 and grounded at an emitter thereof; and a diode 313 connected at the anode thereof to one end of the field coil 102 and connected at cathode thereof to a connecting point between the voltage dividing resistors 303 and 304.

It should be noted that the connecting point between the anode of the diode 311 and the collector of the output transistor 312 is connected to the other end of the field coil 102.

Here, the voltage dividing resistors 301 and 302 constitute a first detection means for detecting a terminal voltage of the storage battery 4 at a storage battery detection terminal T2. The voltage dividing resistors 304 and 305 constitute a second detection means for detecting voltage at an excitation terminal T1 for supplying a field current. The voltage dividing resistors 303, 304 and 305 constitute a third detection means for detecting the voltage at the positive side output terminal 201 of the rectifier 2, i.e., at the rectification output terminal.

Further, the diodes 309, 310 and 313 are reverse-blocking diodes for separating respective detection means and the diode 311 is a surge absorbing diode for absorbing intermittent surges which are generated at the field coil 102. The transistor 307 is intermittently operated in accordance with the conductive or nonconductive state of the Zener diode 308. The output transistor 312 is intermittently controlled by the transistor 307 to control the field current of the field coil 102.

A high voltage vehicle electrical load 5 is disconnected from the storage battery 4 for a short period of time and is driven by generator output. A key switch 6 is connected to the positive side of the storage battery 4 and an output switching controller 7 switches the generator output between the side of the storage battery 4 and the side of the high voltage vehicle electrical load 5. The output switching controller 7 comprises: an output changeover switch 71 provided between the positive side output terminal 201 of the rectifier 2 and the storage battery 4 and the high voltage vehicle electrical load 5; and an excitation switch 72 provided between the excitation terminal T1 and the key switch 6.

It should be noted that the operation of the switches 71 and 72 of the output switching controller 7 are controlled of their operation by control signals from, for example, an external microcomputer (not shown) which is mounted on the vehicle to control an engine, etc.

Operation of this system will be described below.

The output changeover switch 71 of the output switching controller 7 is normally switched toward the storage battery 4 (normal operation mode) and may be switched toward the high voltage vehicle electrical load (high voltage operation mode) for a short period of time (about 5 minutes). It can be used, for example, in a deicing system for rapid melting of ice formed on window glass of the vehicle during winter in extremely cold regions. In such a case, the high voltage vehicle electrical load 5 would be a heater.

First, operation of the normal operation mode in which the storage battery is being charged will be described.

Upon starting of an engine, when the key switch 6 is closed and the excitation switch 72 is turned on, an excitation current flows from the storage battery 4 to the field coil 102 through the key switch 6 and the excitation switch 72, whereby a state in which it is possible to generate electricity is achieved.

Thus, when the engine is started and the AC generator 1 begins to generate electricity, voltage of the rectification output terminal 201 of the rectifier 2, i.e., the output voltage of the AC generator 1, is boosted so that terminal voltage of the storage battery 4 is also raised.

The voltage regulator 3 detects terminal voltage of the storage battery 4 at the storage battery detection terminal T2 by means of the voltage dividing resistors 301 and 302. When such terminal voltage has exceeded a predetermined value set by the voltage dividing resistors 301 and 302 and the Zener diode 308, the Zener diode 308 becomes conductive and the transistor 307 is turned on. In contrast, when the terminal voltage of the storage battery 4 has become lower than the above described predetermined value, the Zener diode 308 becomes nonconductive and the transistor 307 is turned off. Due to such ON/OFF operation, i.e., the intermittent operation of the transistor 307, the output transistor 312 is also intermittently operated. As a result, the field current flowing through the field coil 102 is intermittently controlled whereby the terminal voltage of the storage battery 4 is adjusted to a predetermined value.

When the side of the storage battery detection terminal T2 detecting the terminal voltage of the storage battery 4 is disconnected by some rare accident such as vibration of the engine, the voltage dividing resistors 301 and 302 serving as the first detection means become ineffective. At this time, however, a second detection means operates so that voltage of the excitation terminal T1 for supplying a field current from the storage battery 4 via the key switch 6 and the excitation switch 72 is detected at the voltage dividing resistors 304 and 305 through the reverse-blocking diode 313. The terminal voltage of the storage battery 4 is controlled to a predetermined value which is slightly higher than the predetermined value by the first voltage detection means. The storage battery 4 is thereby prevented from being a damage due to overcharging.

Next, description will be given below of the high voltage operation mode in which the generator output is switched to the high voltage vehicle electrical load 5 by the output changeover switch 71.

First, upon switching of the generator output, the excitation switch 72 is turned off to damp the field current once in order to prevent damage onto the output changeover switch 71 such as from sparks which occur at the time of switching the generator output. The output changeover switch 71 is switched to the side of the high voltage vehicle electrical load 5 after a predetermined time period necessary to the field current. After the completion of the output switching operation to the high voltage side, the excitation switch 72 is turned on so as to generate a high voltage.

Such sequence control of the changeover switches or the like, though not shown, are incorporated into the output switching controller 7. The switches 71 and 72 of the output switching controller 7 are so adapted that their operation is controlled by external control signals based on the sequence control. A detailed description thereof, however, will be omitted.

In this manner, a field current flows through the field coil 102 upon the turning on of the excitation switch 72. The generated voltage of the AC generator 1 is boosted and the voltage of the rectification output terminal 201 of the rectifier 2 is also raised.

In the case of the high voltage operation mode, since the generator output is disconnected from the storage battery 4, the above described first detection means and second detection means do not function. Instead of these, a third detection means functions to detcte voltage at the rectification output terminal 201 based on the voltage dividing resistors 303, 304 and 305. The generated voltage of the AC generator 1, i.e., voltage of the rectification output terminal 201 of the rectifier 2 is controlled by the third detection means to a predetermined value of high voltage so as to drive the high voltage vehicle electrical load 5.

In other words, the Zener diode 308 becomes conductive when the voltage of the rectification output terminal 201 which is the output voltage of the AC generator 1 has exceeded a predetermined value of high voltage set by the voltage dividing resistors 303, 304 and 305 and Zener diode 308 of the voltage regulator 3. By means of operation similar to the above described normal operation mode, the output voltage of the AC generator 1 is controlled to a predetermined value of high voltage and is supplied to the high voltage vehicle electrical load 5 which is for example the load of a heater for a deicing system.

During this high voltage operation mode, the storage battery 4 is not charged and is brought into its discharging state as it supplies the field current of the AC generator 1. Accordingly, in order to prevent an over discharge of the storage battery 4, the high voltage operation mode is limited to a short time period (about 5 min). Further, when the terminal voltage of the storage battery 4 has become lower than a predetermined value, the high voltage operation mode is terminated and the system returns to the normal operation mode in which charging of the storage battery 4 is performed.

Such sequence control, though not shown, is also incorporated into the output switching controller 7, and detailed description thereof will be omitted.

FIG. 4 shows the state of operation of each section when voltage at the rectification output terminal 201 of the rectifier 2 which is an output voltage of the AC generator 1 is switched from a low voltage to a high voltage, i.e., when a changeover from the normal operation mode to the high voltage operation mode is made. "A" in FIG. 4 represents the operation status of the excitation switch 72; "B" in FIG. 4 represents the operation status of the output changeover switch 71; and "C" in FIG. 4 represents changes in output voltage of the AC generator 1. The characteristic as indicated by broken line a of "C" in FIG. 4 is the output voltage characteristic of the AC generator 1 based on a known control system for AC generator as shown in FIG. 3.

Since the conventional control system for AC generator is constructed as described, the output voltage of the AC generator is steeply increased as can be seen from the characteristic indicated by the broken line a of FIG. 4 when a changeover of output voltage of the AC generator is made between the normal operation mode which is a storage battery charging operation and a high voltage operation mode for driving a high voltage electrical load. A problem thus occurs for example in the case of a vehicle or the like mounting the above control system such as a drop in engine rpm, for example, or belt slippage due to an abrupt increase in engine load.

SUMMARY OF THE INVENTION

To solve the above problems, it is an object of the present invention to provide a highly reliable control system for AC generator capable of reducing for example adverse effects of belt slippage or reduced rpm's of the engine of the vehicle due to an abrupt increase in torque of the AC generator.

A control system for AC generator according to one aspect of the present invention comprises: a rectifier for rectifying an AC output of an AC generator having a field coil; a storage battery to be charged by a rectified output of the rectifier; a changeover means for switching between the storage battery and a load to be driven by a voltage higher than a normal output voltage for charging the storage battery; and a voltage regulator for intermittently controlling a field current flowing through the field coil to respectively adjust voltage of the storage battery in a first operation mode and output voltage of the AC generator in a second operation mode to predetermined values of the respective operation modes, whereby an ON period in the intermittent control of the field current is gradually increased when changing over between the first operation mode and the second operation mode. In accordance with such construction, it is possible to avoid an abrupt increase in torque of the AC generator resulting from an abrupt increase in the field current so that such adverse effects as a belt slippage or reduced engine rpms may be reduced to improve the reliability of the system.

In one form of the invention, the voltage regulator includes at least a changeover detection means for detecting switching operation of the changeover means and a setting means for setting the ON period in the intermittent control of the field current based on the output of the changeover detection means. According to such a construction, a function may be advantageously achieved by gradually increasing the ON period in the intermittent control of the field current.

In another form of the invention, the changeover detection means detects the switching operation of the changeover means based on a motion of a switch included in the changeover means. According to such construction, a switching operation of the changeover means may be securely detected.

In a further form of the invention, the changeover detection means detects the switching operation of the changeover means based on control signals to switches that are included in the changeover means. According to such construction, switching operation of the changeover means may be securely detected by a simple and inexpensive construction.

In a still further form of the invention, the voltage regulator sets the ON period in the intermittent control of field current at the time of switching between the first operation mode and the second operation mode to a predetermined minimum value and thereafter increases it gradually to a predetermined maximum value. According to such construction, an abrupt increase in torque of the AC generator due to an abrupt increase in the field current may be securely avoided.

In yet a further form of the invention, the voltage regulator in a steady state of the second operation mode maintains the ON period in the intermittent control of field current to a predetermined maximum value. According to such construction, a stable operation may be secured even at the time of high voltage load.

In still another form of the invention, the voltage regulator operating in the first operation mode halts the function for gradually increasing the ON period in the intermittent control of field current. According to such construction, operation in the first operation mode may be securely performed.

BRIEF DESCRIPTION OF THE DRAWINGS

FIG. 4 shows in contrast characteristics of the output voltage of AC generators respectively according to an embodiment of the control system for AC generator according to the invention and a conventional example.

DESCRIPTION OF THE PREFERRED EMBODIMENTS

Embodiment 1

An embodiment of the present invention as applied to a vehicle will be described below with reference to the drawings.

Figure 1:
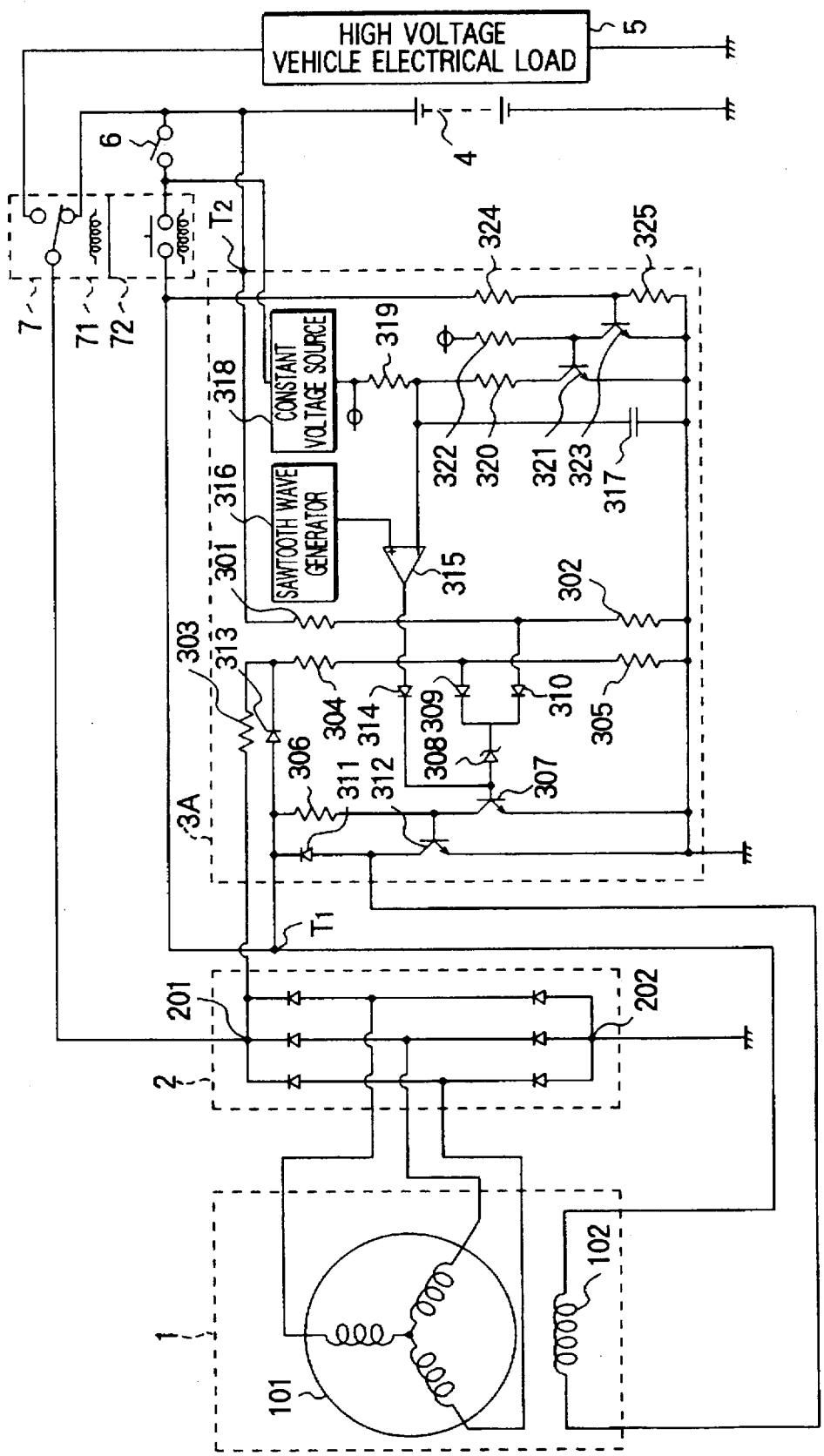
FIG. 1 is a circuit diagram showing an embodiment of the control system for AC generator according to the present invention.
Figure 3:
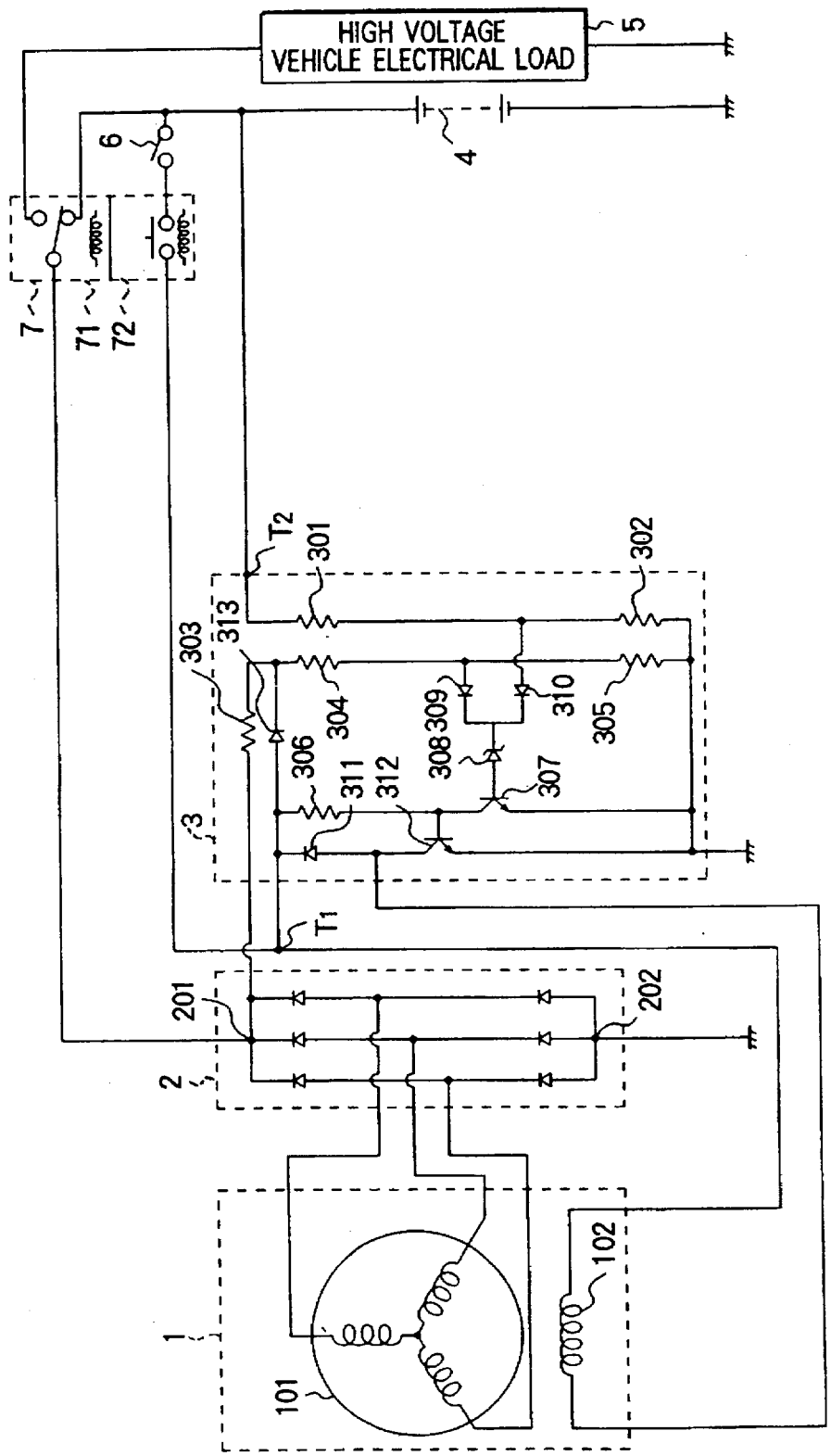
FIG. 3 is a circuit diagram showing a conventional control system for AC generator.

FIG. 1 is a circuit diagram showing an embodiment of the invention, wherein portions corresponding to those in FIG. 3 are denoted by like reference numerals and will not be described in detail.

Referring to FIG. 1, in addition to the components 301 to 313 that are used in the above described voltage regulator 3, a voltage regulator 3A according to the present embodiment includes: a diode 314; a comparator 315; a sawtooth wave generator 316; a capacitor 317; a constant voltage source 318; resistors 319, 320, 322; transistors 321, 323; and voltage dividing resistors 324, 325.

An output end of the comparator 315 is connected to a base of the transistor 307 through the diode 314, a non-inverting input end thereof is connected to the output side of the sawtooth wave generator 316 and an inverting input end thereof is connected to the constant voltage source 318 via the resistor 319.

The capacitor 317 is connected between the inverting input end of the comparator 315 and ground. A series circuit consisting of the resistor 320 and collector-emitter of the transistor 321 is connected in parallel to the two ends of the capacitor 317. The capacitor 317 is charged by the constant voltage source 318 via the resistor 319 and is caused to discharge via the resistor 320 upon turning on of the transistor 321.

The base of the transistor 321 is connected to the constant voltage source 318 via the resistor 322 and at the same time is connected to collector of the transistor 323. An emitter of the transistor 323 is grounded and the base thereof is connected to a connecting point between the voltage dividing resistors 324 and 325 that are connected between the excitation terminal T1 and ground.

It should be noted that the components 314–323 constitute a setting means and the components 324 and 325 constitute a changeover detection means.

Operation of the system will now be described.

The sequence control operation of the output switching controller 7 is similar to the case of FIG. 3. Further, functions of the first detection means, second detection means and third detection means are also similar to the case of FIG. 3. The excitation switch 72 is in its on state in the normal operation mode, i.e., the first operation mode for charging the storage battery and in a steady state of the high voltage operation mode, i.e., the second operation mode for driving a high voltage electrical load, where voltage at the excitation terminal T1 is the same as the terminal voltage of the storage battery 4.

Accordingly, the transistor 323 is brought into its on state by the voltage dividing resistors 324 and 325 which detect voltage of the excitation terminal T1. Since, the transistor 321 is thereby,turned off and the discharging circuit is opened, the capacitor 317 is charged up to a constant voltage by the constant voltage source 318 via the resistor 319.

At this time, terminal voltage of the capacitor 317 is applied to the inverting input end of the comparator 315, while applied to the non-inverting input end thereof as a reference value is a sawtooth wave from the sawtooth wave generator 316. If amplitude of the sawtooth wave supplied to the non-inverting input end of the comparator 315 is set so that the level of the output of the comparator 315 is driven to its low level, the diode 314 remains to be non-conductive whereby the system is brought into its normal operation mode similarly to that of FIG. 3.

In switching the generator output, the excitation switch 72 is first turned off and no voltage is applied to the excitation terminal T1 where the output transistor 307 cannot be driven. The field current is circulated in the field coil 102 through the diode 311 and is gradually damped.

Further, the fact that no voltage has been applied to the excitation terminal T1 is detected by the voltage dividing resistors 324 and 325. The transistor 323 is brought to its off state while the transistor 321 is brought to its on state so that the capacitor 317 is charged from the constant voltage source 318 through the resistor 319 and at the same time is caused to discharge through the resistor 320.

Here, assuming that the resistance values of the resistors 319, 320 are R1, R2, respectively, capacity and terminal voltage of the capacitor 317 are C, VC, respectively, and voltage of the constant voltage source 318 is VA, the charging time constant of the capacitor 317 at the time when the excitation switch 72 is turned on becomes CR1 and the capacitor 317 is charged up to VC=VA.

Further, at the time when the excitation switch 72 is turned off, the capacitor 317 is discharged from VC=VA to R2/(R1+R2)VA at a discharging time constant of CR2.

Accordingly, when the excitation switch 72 is off, the comparator 315 compares the terminal voltage VC of the capacitor 317 with the sawtooth wave from the sawtooth wave generator 316 and, based on such comparison output, the transistor 307 is controlled via the diode 314 such that on-duty portion of the intermittent field current by the output transistor 312, i.e., the continuous time during which the output transistor 312 is on is brought to its minimum value (for example 0% duty or a value in the neighborhood thereof).

If, in this state, the output changeover switch 71 is switched and the excitation switch 72 is then turned on, voltage at the excitation terminal T1 is brought to the same level as the terminal voltage of the storage battery 4. This voltage is detected by the voltage dividing resistors 324 and 325 and the transistor 323 is turned on by the detected voltage. As a result of this, the transistor 321 is brought to its off status. Since, the discharging circuit of the capacitor 317 is then, brought to its open status, the capacitor 317 charged by the constant voltage source 318 up to the constant voltage VA at a time constant of CR1 via the resistor 319.

In other words, the terminal voltage VC of the capacitor 317 is boosted from R2/(R1+R2)VA to VA at a charging time constant of CR1 and the output of the comparator 315 controls the transistor 307 such that on duty portion of the intermittent field current from the output transistor 312 is increased substantially at the charging time constant of CR1.

In describing this operation in more detail, as the terminal voltage of the capacitor 317 applied to the inverting terminal of the comparator 315 is boosted in relation to the sawtooth wave supplied as a reference value to the non-inverting terminal of the comparator 315, the high level time period of the level of the output of the comparator 315 is gradually shortened. Duration of the on state of the transistor 307 to which such high level output is supplied through the diode 314 is also gradually shortened. As a result, duration of ON of the transistor 312 inversely becomes gradually longer whereby the on-duty portion in the intermittence of the field current, i.e., the continuous time period during which the transistor 312 is on is gradually prolonged to increase the generated output of the AC generator 1. Voltage of the rectification output terminal 201 of the rectifier 2 (output voltage of the generator) is gradually increased toward a predetermined maximum output voltage (high output voltage) as indicated by a solid line b in FIG. 4.

As described, in the present embodiment, the on-duty portion of the intermittence of the field current is gradually increased from its minimum value at the time of changeover from the normal operation mode which is an operation for charging the storage battery to the high voltage operation mode for driving a high voltage electrical load. It is thereby possible to avoid an abrupt increase in the torque of the AC generator resulting from an abrupt increase in the field current. Thus, such adverse effects as belt slippage or a drop in engine rpm's in a vehicle may be reduced.

Embodiment 2

Figure 2:
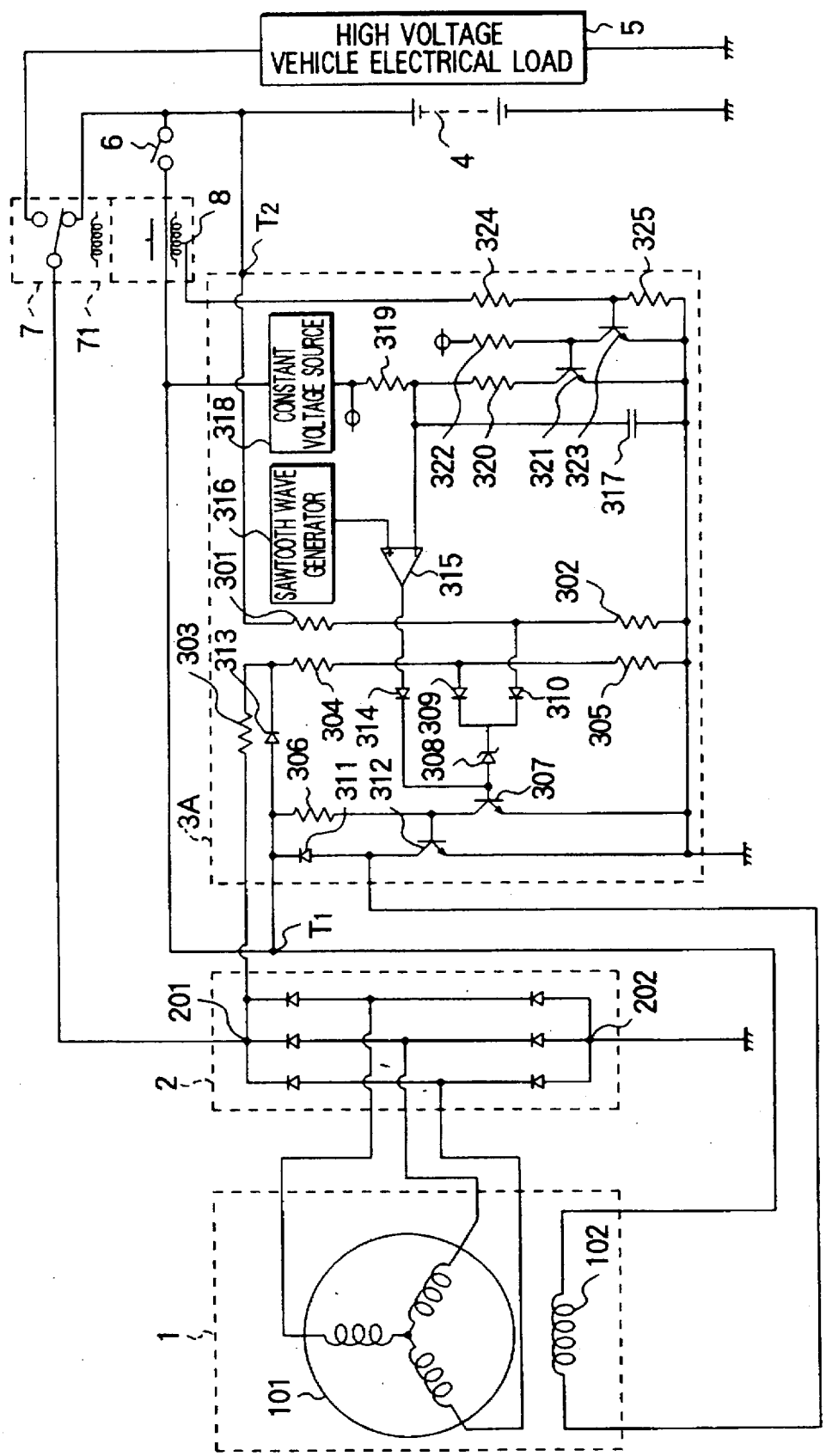
FIG. 2 is a circuit diagram showing another embodiment of the control system for AC generator according to the present invention.

FIG. 2 is a circuit diagram showing another embodiment of the present invention, where like portions as in FIG. 1 are denoted by like reference numerals and will not be described in detail.

In the first embodiment, changeover operation of the output voltage of the AC generator is performed by detecting a change in voltage at the excitation terminal T1 which occurs as a result of an on/off of the excitation switch 72. In the present embodiment, however, it is performed by directly detecting a control signal from the outside for switching between on and off states of the excitation switch 72 which has been used in FIG. 1.

In FIG. 2, an output changeover controller 7A for switching the generator output between the storage battery 4 and the high voltage vehicle electrical load 5 is constituted only by an output changeover switch 71 provided between the positive side output terminal 201 of the rectifier 2 and the storage battery 4 as well as the high voltage vehicle electrical load 5. However, the excitation switch 72 used in the above described output changeover controller 7 is not used and, in the present embodiment, only a control signal 8 which has been applied to the excitation switch 72 from the outside is used so as to supply a control signal to the section of the voltage dividing resistors 324 and 325.

When switching from the normal operation mode which is an operation for charging the storage battery to the high voltage operation mode for driving a high voltage electrical load, the control signal 8 is detected at the voltage dividing resistors 324 and 325. The field current is damped once by turning the transistor 323 off, turning the transistor 321 on, turning the transistor 307 on and turning the transistor 312 off. Thereafter, the output changeover switch 71 is switched toward the high voltage vehicle electrical load 5 and, then, operation similar to that described above is performed. Thus, the operation after that point on is similar to the first embodiment and will not be described.

As has been described, the on-duty portion in the intermittence of field current in the present embodiment is also gradually increased from its minimum value similarly to the first embodiment when a changeover is made from the normal operation mode which is an operation for charging the storage battery to the high voltage operation mode for driving a high voltage electrical load. It is thereby possible to avoid an abrupt increase in the torque of the AC generator resulting from an abrupt increase in the field current. Thus, such adverse effects as belt slippage or a drop in engine rpm's in a vehicle may be reduced.

Further, in the present embodiment, since the excitation switch 72 is unnecessary, the construction of the output switching controller 7 becomes simpler and its cost is also reduced.

Embodiment 3

While, in the above embodiments, a case has been described of switching from the normal operation mode which is an operation for charging the storage battery to a high voltage operation mode for driving a high voltage electrical load, the present invention may also be applied to and be similarly advantageous in a case of switching in the opposite direction.

Further, while, in the above embodiments, a case has been described of applying the present invention to a vehicle, it is not limited to such. It may also be applied to and be similarly advantageous in such facilities as a vessel or aircraft which requires a control system of this type.

What is claimed is:

1. A control system for an AC generator comprising:
   a rectifier connected to said AC generator for rectifying an AC output from said generator, wherein said AC generator includes a field coil;
   a storage battery connected to the rectifier and charged by a rectified output thereof;

a changeover switching means provided between the storage battery and a high voltage electric load, said changeover switching means switching between said storage battery and said load; and a voltage regulator connected to said storage battery through said changeover switching means and connected to said AC generator, said voltage regulator providing intermittent control of said generator output to a first predetermined value in a first operation mode when said generator output is connected to said battery and to adjust said AC generator output to a second predetermined value in a second operation mode when said generator output is connected to said electric load, an ON period in said intermittent control of said generator output being gradually adjusted when switching from said first operation mode to said second operation mode and when switching from said second operation mode to said first operation mode.

2. A control system for an AC generator according to claim 1 wherein said voltage regulator includes a changeover detection means connected to said changeover switching means for detecting switching between said battery and said load and a setting means connected to said changeover detection means for setting said ON period in said intermittent control of field current based on an output of said changeover detection means.

3. A control system for an AC generator according to claim 2 wherein said changeover switching means includes a switch connected to said storage battery and said changeover detection means detects said switching of said changeover switching means based on a motion of said switch.

4. A control system for an AC generator according to claim 2 wherein said changeover detection means detects said switching of said changeover switching means based on a control signal to said changeover switching means.

5. A control system for AC generator according to claim 1 wherein said voltage regulator sets the ON period in said intermittent control of field current to a predetermined minimum value at the time of switching between said first operation mode and said second operation mode, said ON period thereafter being gradually increased to a predetermined maximum value.

6. A control system for AC generator according to claim 1 wherein said voltage regulator in a steady state of said second operation mode maintains the ON period in said intermittent control of field current to a predetermined maximum value.

7. A control system for an AC generator according to claim 1 wherein said voltage regulator in said first operation mode can disconnect said gradual increase of the ON period in said intermittent control of field current.

8. A control system for AC generator according to claim 1 wherein said voltage regulator includes a changeover detection means connected to said changeover switching means for detecting switching operations thereof and a setting means connected to said changeover detection means for setting the ON period in said intermittent control of field current based on an output of said changeover detection means, wherein said voltage regulator sets the ON period in said intermittent control of field current to a predetermined minimum value during switching between said first operation mode and said second operation mode, said ON period thereafter being gradually increased to a predetermined maximum value.

9. A control system for AC generator according to claim 1 wherein said voltage regulator includes a changeover detection means connected to said changeover switching means for detecting switching operation thereof and a setting means connected to said changeover detection means for setting the ON period in said intermittent control of field current based on output of said changeover detection means, wherein said voltage regulator in a steady state of said second operation mode maintains the ON period in said intermittent control of field current to a predetermined maximum value.

10. A control system for AC generator according to claim 1 wherein said voltage regulator includes a changeover detection means connected at least to said changeover switching means for detecting switching operations thereof and a setting means connected to said changeover detection means for setting the ON period in said intermittent control of field current based on an output of said changeover detection means, and wherein said voltage regulator in said first operation mode halts the function for gradually increasing the ON period in said intermittent control of field current.

* * * * *